United States Patent [19]

Metzger

[11] Patent Number: 5,203,121

[45] Date of Patent: Apr. 20, 1993

[54] METHOD FOR FILTERING AND COOLING SURFACE FINISHING COMPOUNDS

[76] Inventor: George L. Metzger, 323 Eighth St., Downers Grove, Ill. 60515

[21] Appl. No.: 697,399

[22] Filed: May 9, 1991

[51] Int. Cl.$^5$ ............................................. B24C 9/00
[52] U.S. Cl. ........................................ 51/322; 51/318; 51/425; 51/323
[58] Field of Search ................. 51/266, 322, 323, 318, 51/424, 425; 165/111

[56] References Cited

U.S. PATENT DOCUMENTS 3,286,406 11/1966 Ashworth ............................ 51/425
3,912,000 10/1975 Nyeste ................................ 165/111

*Primary Examiner*—Bruce M. Kisliuk
*Assistant Examiner*—Eileen Morgan
*Attorney, Agent, or Firm*—McAndrews, Held & Malloy, Ltd.

[57] ABSTRACT

Spent surface finishing compound is filtered and cooled or heated for reuse in a machine finishing process. The spent finishing compound is filtered through a pleated polyester or polypropylene wound filter cartridge to remove particles of a predetermined size ranging from about 0.5 to 100 microns. The surface finishing compound circulates through an in-line, constant flow intercooler having a chamber for receiving and maintaining the finishing compound in a spiral circulation. The surface finishing compound circulates about cooling tubes positioned within the chamber. Heat is exchanged between the circulating water within the cooling tubes and the surface finishing compound.

9 Claims, 1 Drawing Sheet

METHOD FOR FILTERING AND COOLING SURFACE FINISHING COMPOUNDS

BACKGROUND OF THE INVENTION

In the surface finishing industry, machine tools are used to grind, cut, polish, lap, and finish the surfaces of plastic, metal, glass, and electronic components. An example would be grinding and polishing of plastic or glass optical lenses. These finishing processes utilize abrasives, polishing compounds, and coolants, all generally referred to as surface finishing compounds or slurries. The coolants generally are formulated with lubricants, rust inhibitors, and other surface active agents for cleanliness and low-foaming characteristics.

During the machine finishing processes, the surface finishing compounds become contaminated with impurities which may include plastic, glass, and ceramic particles, abrasive grains and binding agents, and other ferrous and nonferrous particles. The surface finishing compounds further are heated as a result of the friction generated during the machining processes.

It is economically desirable to recycle and reuse the surface finishing compounds which have been spent in the machine finishing process. This generally requires that the impurities be removed and the resulting surface finishing compounds be chilled to the desired cooling temperature. In certain unique circumstances, such as the use of rare earth oxide polishing compounds, it may be necessary to heat the finishing compounds to a desired temperature for best results.

The present filtering and cooling/heating systems for finishing compounds use a wide variety of options. Filtering is accomplished, among other methods, by: settling tanks; paper, fabric or cartridge media; hydrocyclones; or centrifuges. The finishing compounds and slurries generally are chilled or heated through a system of pumps and tanks or reservoirs. The surface finishing compound or slurry is stored temporarily in a storage tank or reservoir which has been fitted with refrigerant coils connected to a typical chiller. The chiller and coils chill the finishing compound to the desired temperature before it is reused in the process. When heating is desired, heater coils are used in lieu of refrigerant coils.

The problem, which is one of the bases for the invention, is that the present filtering and cooling/heating systems use a maze of filters, pumps and tanks to prepare the recycled surface finishing compounds. These systems are expensive to install, operate and maintain and take up extensive floor space at the site of the finishing processes.

SUMMARY OF THE INVENTION

One object of the present invention is to provide an improved method for filtering and cooling/heating surface finishing compounds and other slurries.

Another object of the present invention is to provide a new and improved process and apparatus for cooling or heating surface finishing compounds.

A further object of the present invention is to reduce the capital and operating expenses and reduce the floor space requirements for a filtering and cooling/heating system for surface finishing compounds and other slurries.

Another object of the present invention is to provide an improved method for filtering and cooling/heating hazardous surface finishing compounds.

Further objects and improvements of the present invention will be apparent upon reading the specification and claims.

According to the present invention, spent surface finishing compound is collected from a machine finishing process. The spent compound is filtered through a pleated polyester or polypropylene wound filter cartridge to remove particles of a predetermined size ranging from about 0.1 to 100 microns and larger.

The surface finishing compound then is transferred through an in-line, constant flow intercooler having a chamber for receiving and maintaining the finishing compound in a spiral circulation. The surface finishing compound circulates about cooling tubes positioned within the chamber to cool the finishing compound. The cooling tubes carry cooling fluid circulated from a chiller unit. The recycled surface finishing compound is returned to the machine finishing process. Depending on the use and type of finishing compound, the in-line intercooler may be used to heat the finishing compound in lieu of cooling the compound.

The intercooler includes a cylindrical chamber and continuous cooling tubes looping in a generally parallel, spaced relationship along the axis of the cylindrical chamber. The surface finishing compound enters the chamber at one end of cylindrical chamber in a direction generally tangent to the wall of the cylindrical chamber and perpendicular to the axis of the cylindrical chamber. This arrangement causes the finishing compound to swirl or spiral about the cooling tubes, which are spaced from the inner wall of the cylindrical chamber, until the finishing compound exits at the opposite end of the cylindrical chamber.

These and other objects, advantages, and features of the invention will be set forth in the detailed description which follows.

DETAILED DESCRIPTION OF THE INVENTION

Surface finishing compounds include, but are not limited to, abrasives, polishing compounds, and coolants used in connection with the grinding, cutting, lapping, polishing, finishing, or other machining of glass, metal, plastic, electronic component or similar surfaces. Examples of surface finishing compounds include, but are not limited to, ceralum alumina, silicon carbide, boron carbide, aluminum oxide, corundum powder, synthetic and water coolants, silica, quartz, aluminum, silicon, cerium oxide, rare earth oxides, and zirconium oxide.

Figure 1:
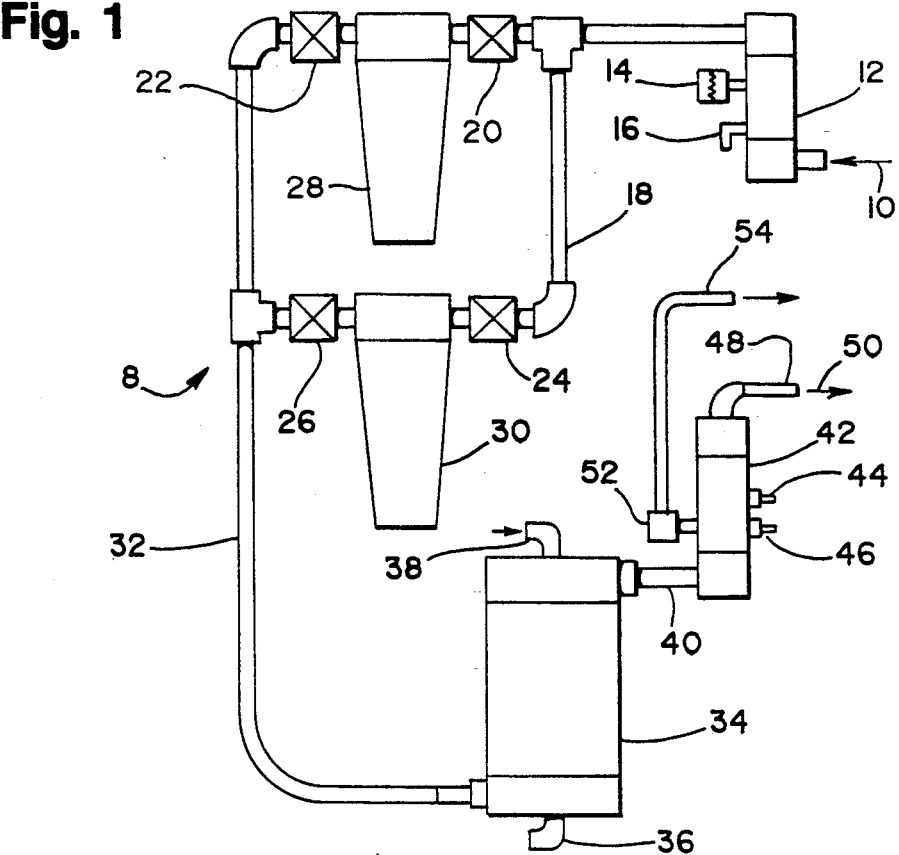
FIG. 1 is a schematic representation of the method for filtering and cooling surface finishing compounds according to the present invention.

FIG. 1 depicts a system 8 for filtering and cooling a surface finishing compound which has been spent in connection with a machine finishing process. The spent surface finishing compound is recycled for reuse in the machine finishing process. Depending on the nature of the finishing compound and machine finishing process, the system may be implemented to heat the finishing compound instead of cooling the compound.

Referring to FIG. 1, the spent surface finishing compound is collected from the machine finishing process (not shown). The finishing compound is pumped or delivered to the intake manifold 12 at inlet 10. A pressure gauge 16 and an adjustable diaphragm pressure sensor 14 are connected to the intake manifold 12, which provides a means for gauge instrumentation.

The pressure sensor 14 detects the fluid pressure in the intake manifold 12 and compares it to preset pressure points ranging from about 0 to 60 psi. When the fluid pressure in the intake manifold 12 reaches a preset level, for example at 22 psi, the pressure sensor 14 activates the solenoid valve 52 and may activate a typical alarm or warning light (not shown). The solenoid valve 52 opens to permit the finishing compound to bypass the discharge manifold 42 through bypass return line 54 for the reasons explained below. The pressure sensor 14 monitors a rise in fluid pressure which may indicate the need to change the filters 28 and 30 or that the flow of the finishing compound to the machine finishing process has been shut off or blocked. In this fashion, the pressure sensor 14 serves as a safety mechanism.

The spent finishing compound flows from the intake manifold 12 to the filters 28 and 30. Isolation and shutoff valves 20, 22, 24, and 26 permit the filters 28 and 30 to be used on line separately or in combination. Any number of filters may be used. In addition, a bypass line (not shown) could be used to bypass the filters when the fluid pressure in the intake manifold 12 reaches a preset level or when the filters are cleaned or changed.

The filters preferably are standard pleated polyester cartridge type or polypropylene fiber wound cartridge type. These filters are available commercially. An example would be the Excel models manufactured by Eden Equipment Company. The nominal pore sizes generally range between about 0.1 and 100 microns. A typical pleated filter would have four square feet of media per ten inches of filter cartridge length. The filters 28 and 30 are adapted to remove substantially the impurities and particles in the finishing compounds having a size greater than the nominal pore size of the filters. Alternative filtering methods such as hydrocyclones, centrifuges, and the like could be used.

Figure 2:
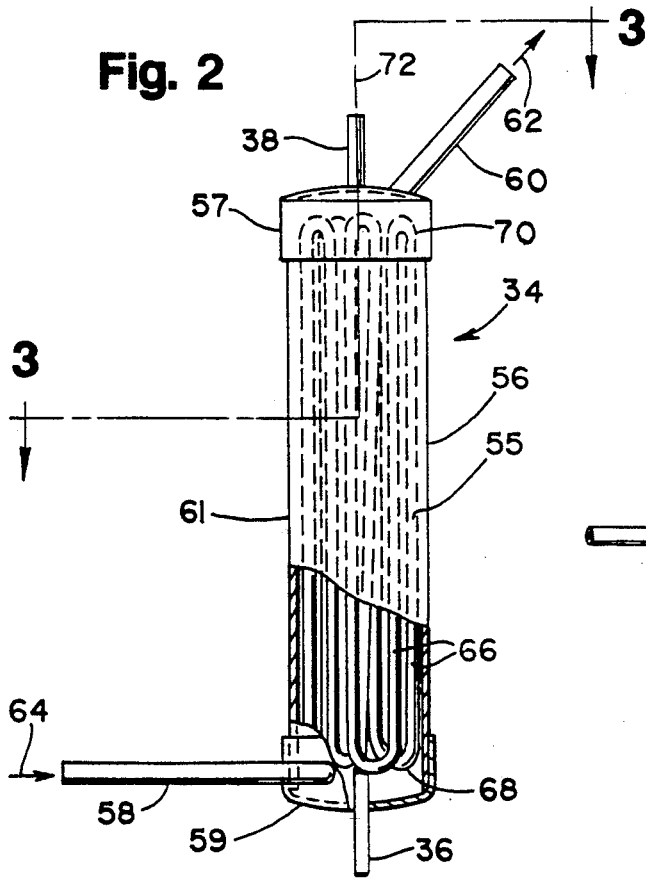
FIG. 2 is a perspective and cross-sectional representation of the in-line intercooler according to the present invention.
Figure 3:
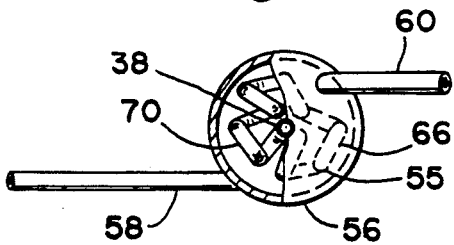
FIG. 3 is a section 3—3 through the intercooler according to FIG. 2.

The filtered finishing compound flows from the filters 28 and 30 through feed line 32 to the intercooler 34. The intercooler 34 has a chamber for receiving and maintaining the finishing compound in a spiral circulation. Referring to FIGS. 2 and 3, the intercooler 34 includes a cylindrical chamber 56, intercooler inlet 58, intercooler outlet 60, and cooling tubes 55. The cylindrical chamber 56 has a cylindrical sidewall 61, top portion 57, and bottom portion 59. The cylindrical chamber may be Schedule 40 PVC, stainless steel or similar materials.

The cooling tubes 55 are looped continuously in a generally parallel, spaced relationship along the axis 72 of the cylindrical chamber 56. The cooling tubes 55 include multiple legs 66 and loops 68 and 70 which are arranged in a spaced relationship from the chamber sidewall 61. A preferred arrangement has ten or twelve legs and loops. The materials of the cooling tubes could be copper or stainless steel.

The circulating water or fluid enters the cooling tubes 55 through circulating water inlet 38 which penetrates the closed chamber top portion 57. The circulating water exits the cooling tubes 55 through circulating water outlet 36 which penetrates the closed chamber bottom portion 59. The direction of the flow of the circulating water or fluid could be reversed.

The circulating water is cooled or heated, depending on the desired temperature change for the finishing compounds, and then circulated through a typical arrangement of water circulation pumps, valving, piping and temperature control units. The temperature control units can be standard chiller units for cooling or standard heating units for heating the circulating water. The intercooler and its in-line, constant flow cooling/heating features eliminate the need for conventional, inefficient storage tanks having cooling/heating coils to cool or heat the entire contents. As a result, the temperature control units can be downsized from the units used in conventional processes. Typical chiller units include the Temprite TR Series.

The surface finishing compound 64 enters the cylindrical chamber 56 through intercooler inlet 58 in a direction generally tangent to the sidewall 61 and perpendicular to the axis 72 of the cylindrical chamber. This arrangement causes the finishing compound to swirl or spiral about the cooling tubes until the finishing compound exits 62 at the opposite end through intercooler outlet 60. Heat is exchanged between the circulating water and the finishing compound to bring the finishing compound to the desired temperature. The intercooler inlet and outlet can be positioned at various other locations. An alternative arrangement would permit the circulating water to flow through the cylindrical chamber and the finishing compound to flow through the cooling tubes.

The finishing compound is delivered from the intercooler 34 through manifold inlet 40 to the discharge manifold 42. Temperature probes 44 and 46 and solenoid valve 52 are connected to the discharge manifold 42. The temperature probe 42 can be the capillary tube type which controls a thermostat. The thermostat is electrically connected to the controls of the water circulating pump for determining the flow rate of the circulating water or fluid having a present temperature. The circulating water flow rate, in turn, controls the amount of heat exchanged in the intercooler. Alternatively, the temperature of the circulating water may be changed to control the amount of heat exchanged. Temperature probe 44 also can be the capillary tube type and provides a temperature gauge to monitor visually the temperature of the finishing compound leaving the intercooler. Other types of temperature probes could be used.

The solenoid valve 52 is electrically connected to the pressure sensor 14. The solenoid valve 52 opens when the pressure detected in the intake manifold 12 exceeds a preset level. In these circumstances, the finished compound would partially or entirely bypass the discharge line 48 of the discharge manifold 42 and pass through the bypass return 54. The bypassed finishing compound would be returned to the inlet 10 or a storage basin and would not be returned directly to the machine finishing process. The recycled finishing compound leaves discharge line 48 and is delivered for reuse in the surface machine finishing process.

The entire system 8 is arranged in a compact fashion and mounted on a cabinet with casters. The monitoring controls can be mounted on a panel.

The present invention was tested with satisfactory filtering and cooling of finishing compounds used in connection with four machines polishing CR-39 plastic optical lenses and two machines polishing polycarbonate optical lenses. The finishing compound was alumina-based polishing slurry at 2 micron average particle size. Tests were run with two 20-inch pleated polyester cartridge type filters and two 20-inch polypropylene fiber wound cartridge type filters. The cooling water was supplied at a rate of approximately 9.6 gph at an average temperature of 60° F. from a Temprite TR-10 chiller. The polishing compound was recycled at a rate of approximately 19 gpm and maintained at an ambient temperature of 70° F. The intercooler was four inches in diameter and approximately 24 inches in length. The cooler tubes were ½-inch size. The average starting pressure was 18 psi, and the filters were changed when the pressure increased to approximately 22 psi.

Under the described conditions, the filter life and number of lens surfaces polished during that period were as follows:

|  | Average Filter Life, hours | Average Number of Surfaces Polished |
| --- | --- | --- |
| Pleated Polyester Filter |  |  |
| 30 Micron Pore | 16 | 457 |
| Polypropylene Fiber Filter |  |  |
| 50 Micron Pore | 40 | 1,643 |
| 30 Micron Pore | 24 | 975 |

Since the invention, as disclosed herein, may be embodied in other specific forms without departing from its spirit or central characteristics, the preferred embodiment described herein is therefore to be considered in all respects as illustrative and not restrictive. The scope of the invention is indicated by the following claims rather than the foregoing description, and all changes that come within the meaning and range of equivalency of the claims are therefore intended to be embraced in the claims.

What is claimed is:

1. A method for recycling spent finishing compounds used in surface machine finishing processes, comprising the steps of:
   a. collecting the spent finishing compound used in a surface machine finishing process;
   b. filtering the spent finishing compound to remove particles of a predetermined size ranging from about 0.1 to 100 microns;
   c. transferring the spent finishing compound through an in-line, constant flow intercooler having a chamber for receiving and maintaining the finishing compound in a spiral circulation and having cooling tubes;
   d. circulating fluid having a preset temperature from a temperature control unit to the cooling tubes of the intercooler about which the finishing compound circulates to change the temperature of the finishing compound to a predetermined level; and
   e. returning the finishing compound to the surface machine finishing process.

2. The method according to claim 1 wherein the temperature control unit is a chiller unit for controlling the temperature of the circulating fluid to decrease the temperature of the finishing compound to a predetermined level.

3. The method according to claim 2 which includes the step of monitoring the temperature of the finishing compound leaving the intercooler and adjusting the flow rate of the circulating fluid to change the rate of cooling in response to a deviation from a predetermined temperature of the finishing compound.

4. The method according to claim 1 which includes the step of monitoring the pressure level of the finishing compound and diverting the recycled finishing compound from returning to the surface machine finishing process when a predetermined pressure is exceeded.

5. The method according to claim wherein the spent finishing compound is filtered to remove particles of a predetermined size ranging from about 20 to 50 microns.

6. The method according to claim 1 wherein the intercooler includes a cylindrical chamber having an axis, a cylindrical chamber sidewall, an intercooler inlet, and an intercooler outlet, the cooling tubes having a circulating fluid inlet, a circulating fluid outlet, and multiple legs and loops which are connected and looped continuously in a substantially parallel, spaced relationship along the axis of the cylindrical chamber, the cooling tubes further arranged in a spaced relationship from the chamber sidewall.

7. The method according to claim 6 wherein the cooling tubes have at least ten legs and ten loops.

8. The method according to claim 6 wherein the intercooler inlet is positioned in a direction substantially tangent to the chamber sidewall and substantially perpendicular to the axis of the cylindrical chamber.

9. The method according to claim 6 wherein the cylindrical chamber further includes a closed first end portion and closed second portion, the circulating fluid inlet penetrates the first end portion and the circulating fluid outlet penetrates the second end portion permitting the circulating fluid to flow to and from the cooling tubes positioned within the cylindrical chamber.

* * * * *